July 5, 1966  L. E. SCHUTT  3,258,922
PRESSURE FLUID SYSTEM AND FLOW CONTROL VALVE THEREFOR
Filed March 19, 1965  3 Sheets-Sheet 1
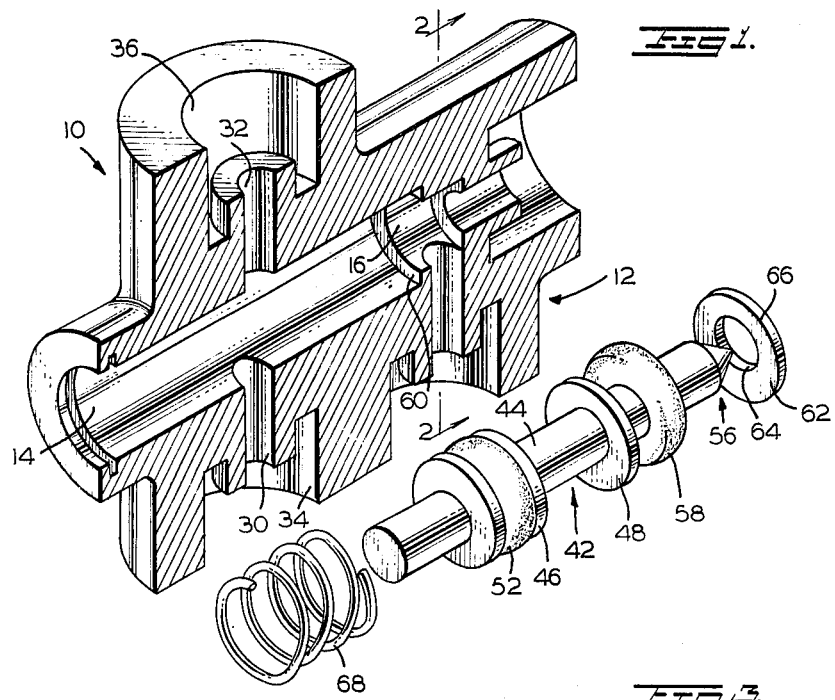
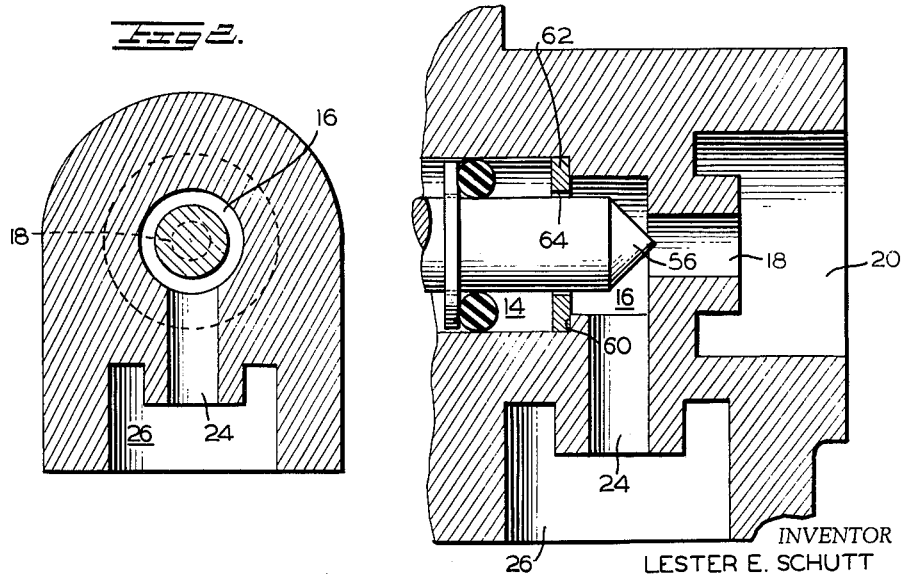
INVENTOR
LESTER E. SCHUTT
BY *Stowell & Stowell*
ATTORNEY July 5, 1966 L. E. SCHUTT 3,258,922
PRESSURE FLUID SYSTEM AND FLOW CONTROL VALVE THEREFOR
Filed March 19, 1965 3 Sheets-Sheet 2
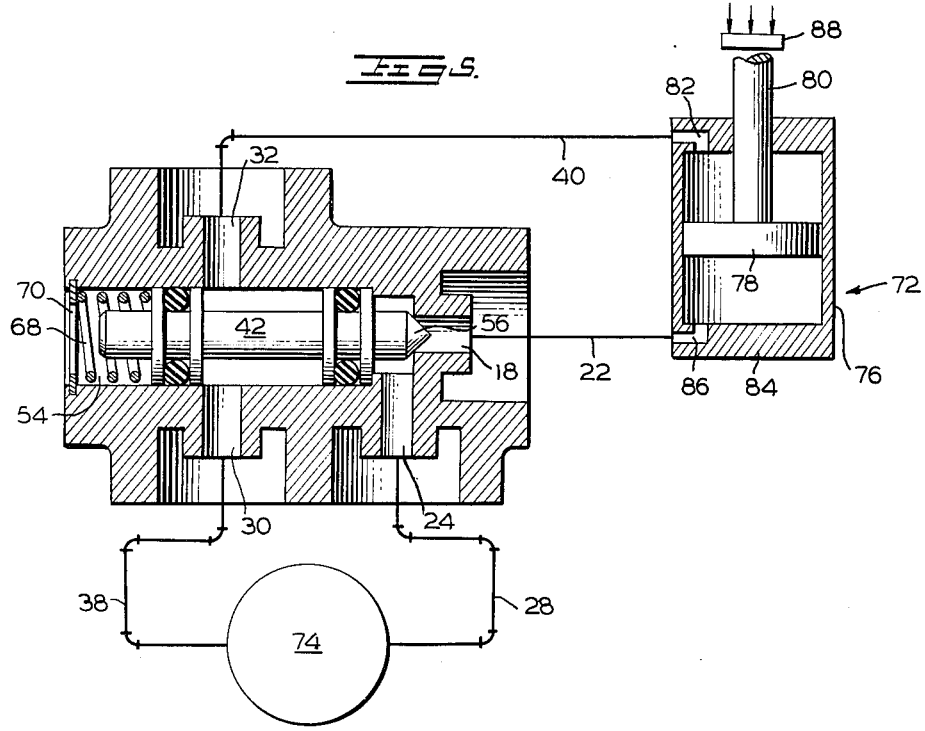
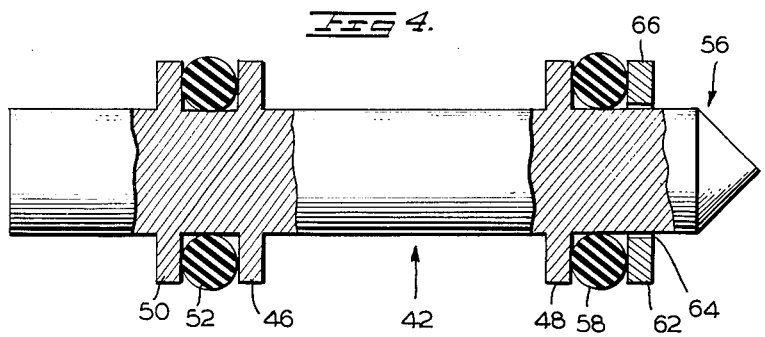
INVENTOR
LESTER E. SCHUTT
BY *Stowell & Stowell*
ATTORNEY

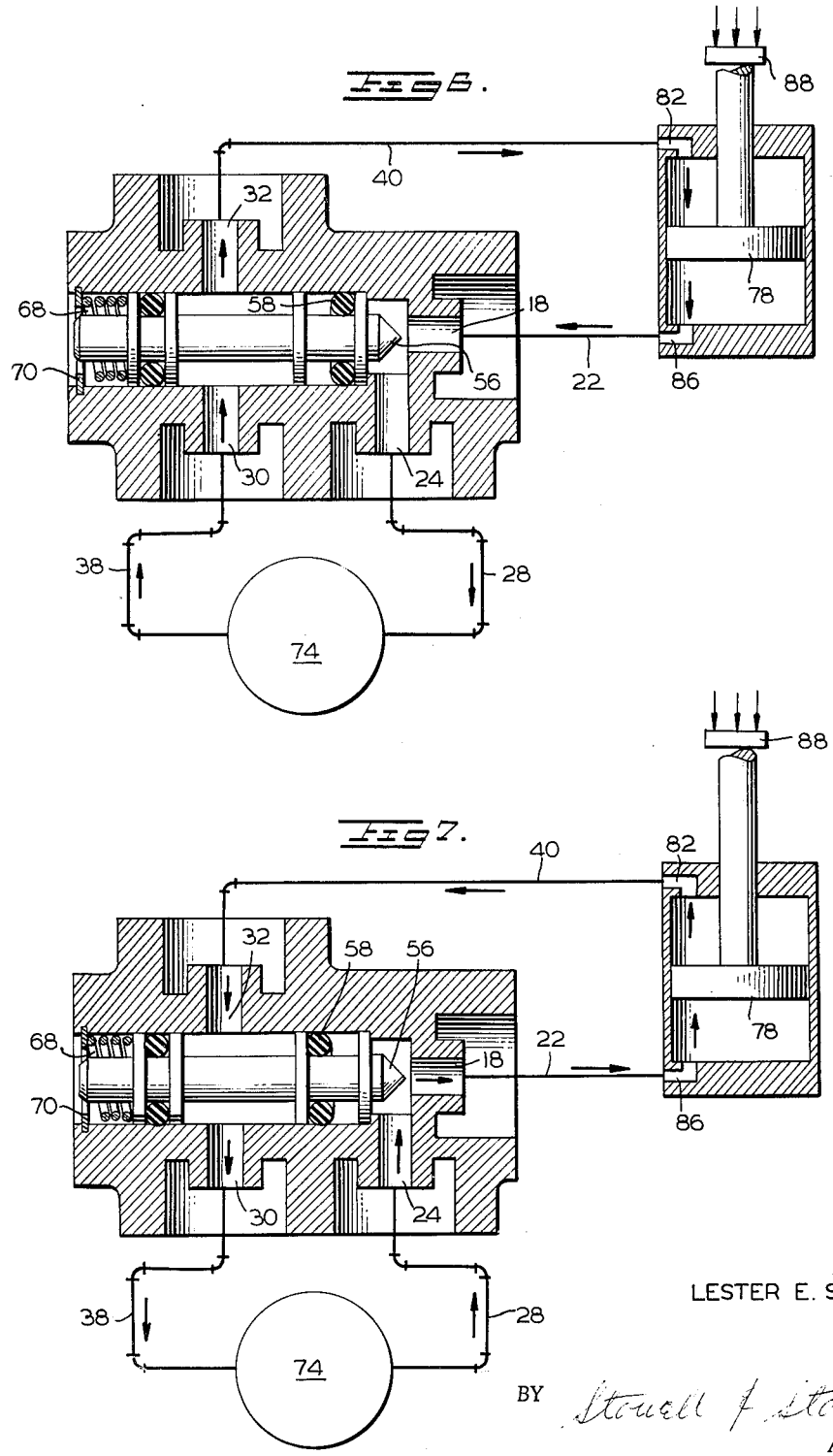

United States Patent Office 3,258,922
Patented July 5, 1966

3,258,922
PRESSURE FLUID SYSTEM AND FLOW CONTROL
VALVE THEREFOR
Lester E. Schutt, Dearborn Heights, Mich., assignor to
Dura Corporation, Oak Park, Mich., a corporation of
Michigan
Filed Mar. 19, 1965, Ser. No. 441,256
6 Claims. (Cl. 60—52)

This invention relates to improvements in pressure fluid control systems and to an improved pressure actuated flow control valve.

It is an object of the present invention to provide a very simple but highly effective pressure actuated flow control valve for a pressure fluid control system whereby a motion device may be automatically maintained in any selected position by merely stopping the actuation of a pressure fluid pump in the system.

Another object is to provide such a device and system wherein the motion device is automatically reactivated upon reactuation of the pump of the system.

A further object is to provide such a system and control device which will function in unidirectional or reversible pressure fluid systems.

A further object is to provide a pressure sensitive fluid flow control device wherein the sensitivity of the device may be readily varied by varying the force of a resilient biasing means in the device.

These and other objects and advantages are provided in a closed circuit pressure fluid control system including a reversible pump having pressure fluid inlet and outlet ports, a fluid pressure motion device having fluid inlet and outlet ports, and a fluid flow control device between said pump and the motion device, said flow control device comprising a housing having a bore therein, a flow control spool slidably mounted in said bore, first and second spaced lands on said spool, a pair of fluid pressure ports in said housing each communicating with the spool between said first and second spaced lands, conduit means connecting one of the pump ports and one of the motion device ports through said pair of ports in the control device housing, a pressure fluid control port in said housing at one end of the spool bore and adjacent said first land, conduit means connecting the other motion device port and the control port, resilient means continuously urging said spool into fluid sealing engagement with said control port, a further fluid pressure port in said housing communicating with the spool bore between the first spool land and the control port, conduit means connecting the other pump port and said further pressure port in the housing, sealing means mounted on said spool for sliding movement between said first land and the further fluid pressure port and sealing the pair of fluid pressure ports from the control port and the further fluid pressure port; and the advantages are provided by a flow control valve comprising a housing having a bore therein, a flow control spool slidably mounted in said bore, first and second spaced lands on said spool, a pair of fluid pressure ports in said housing each communicating with the spool between said first and second spaced lands, a pressure fluid control port in said housing at one end of the spool bore and adjacent said first land, resilient means continuously urging said spool into fluid sealing engagement with said control port, a further fluid pressure port in said housing communicating with the spool bore between the first spool land and the control port, and sealing means mounted on said spool for sliding movement between said first land and the further fluid pressure port and sealing the pair of fluid pressure ports from the control port and the further fluid pressure port.

The invention will be more particularly described in reference to the following drawings wherein:

FIG. 1 is an exploded perspective view in partial section of a flow control valve constructed in accordance with the teachings of the present invention;

FIG. 2 is a section substantially on line 2—2 of FIG. 1;

FIG. 3 is an enlarged fragmentary section of the valve controlled outlet of the device shown in FIG. 1;

FIG. 4 is an enlarged view in partial section of the flow control spool of the device shown in FIG. 1;

FIG. 5 illustrates a closed circuit pressure fluid system including the flow control valve shown in FIG. 1 with the control spool shown in the pressure holding position;

FIG. 6 is a view similar to that shown in FIG. 5 with the motion device moving in a downwardly direction; and FIG. 7 is a view similar to that shown in FIG. 6 with the motion device moving in the upwardly direction.

Referring to the drawings and in particular to FIGS. 1 through 4 thereof 10 generally designates a form of the improved flow control device. The device 10 includes a housing or body portion 12 having a spool receiving bore 14 therein.

One end of the spool bore 14 communicates with a chamber 16 which in turn communicates with a pressure fluid control port 18. The control port 18 in turn communicates with a bore 20 adapted to receive one end of a pressure fluid line 22 (FIGS. 5, 6, and 7).

Chamber 16 is also in communication with a further port 24 which like port 18 communicates with a bore 26 adapted to receive a pressure fluid line 28.

The housing also includes first and second ports 30 and 32 which communicate with the spool bore 14 and each port further communicates with a bore 34 and 36 respectively adapted to receive pressure fluid lines 38 and 40 shown in FIGS. 5, 6 and 7.

Spool bore 14 slidably receives a spool 42, best shown in FIGS. 1 and 4 of the drawings. The main body 44 of spool 42 has a diameter substantially less than the spool bore 14 and the spool body 44 has secured thereto or integral therewith a pair of spaced lands 46 and 48.

The lands 46 and 48 are spaced a distance such that during movement of the spool the lands remain on opposite sides of the ports 30 and 32 whereby these ports are in continuous communication. Further each land 46 and 48 is sized such that the spool has free sliding movement within its bore 14.

In the illustrated form of the invention land 46 has a cooperating land 50 and between lands 46 and 50 is positioned a sealing ring 52. It will be appreciated that the pair of lands 46 and 50 and the O-ring seal 52 provide a simple procedure for sealing the pressure fluid from ports 30 and 32 from a spring receiving chamber 54 and therefore eliminates the need for accurate machining of the valve bore 14 and land 46.

End 56 of spool 42 is adapted, in one position of the spool to seat against the inner end of the flow control port 18 and in the illustrated form of the invention the end 56 is conical in shape. However, the conical seat may be replaced by other seat configurations and the end 56 and be modified to receive a resilient seat as is known in the valve art.

On the valve seal side of land 48 is mounted a sealing member 58 which is shown as a resilient O-ring.

This O-ring 58 provides a fluid tight seal between ports 30 and 32 and valve chamber 16 and in so doing the O-ring moves to either form a seal at the valve seat side of land 48 or a seal in combination with annular flange 60 which separates the spool bore 14 and chamber 16. In the illustrated form of the invention this latter seal is improved by the provision of ring 62.

The bore 64 in ring 62 is larger than the diameter of the spool body 44 whereby the spool freely slides therethrough while leaving space for the flow of pressure fluid between the bore and the surface of the spool body. The outer diameter 66 of the ring 62 may be of a size to snugly fit in the spool bore 14 whereby when the ring is positioned in abutting engagement with flange 60 it remains in that position while the spool and O-ring seal move axially relative thereto.

The assembly also includes a helical spring 68 which continuously urges spool 42 into a position whereby seat 56 seals flow control port 18. The spring 68 is maintained in the spring chamber 54 by a snap ring 70. It will be appreciated that the snap ring 70 could be replaced with a threaded element whereby the force of spring 68 acting against the spool 42 may be readily varied without the necessity of actually changing the spring.

Operation of the flow control spool will be more clearly illustrated in reference to FIGS. 5, 6 and 7 which show the flow control valve 10 in combination with a motion device 72 and a reversible pump 74. The reversible pump 74 has pressure fluid inlet and outlet ports to which are connected pressure fluid lines 28 and 38.

The motion device 72 illustrated in FIGS. 5, 6 and 7 comprises a ram cylinder 76 having a ram piston 78 and piston rod 80 slidably mounted therein. The rod end of cylinder 76 has a pressure fluid inlet and outlet port 82 therein which is connected to pressure fluid line 40. The opposite end 84 of the cylinder has an inlet and outlet port 86 therein which port is connected to pressure line 22 the opposite end of which connects to fluid control port 18 of the flow control device 10. The work to be done by the ram is diagrammatically illustrated by mass 88.

While a ram type motion device has been specifically described a rotary or the like motor may be used in the system.

The system shown in FIG. 5 is in a "holding" position in that pump 74 is not energized and pressure lines 28, 38 and 40 are under no pressure. Line 22, however, is under the pressure necessary to maintain load or mass 88 in the illustrated position. Fluid under pressure is maintained below the piston 78 and in line 22 by the force of helical spring 68 forcing valve seat end 56 of valve spool 42 into sealing engagement with the cooperating seat on the inner end of control port 18.

When it is desired to move mass 88 downward pump 74 is actuated in a direction such that lines 38 and 40 become the high pressure lines and lines 22 and 28 the return lines.

As the pressure in the valve chamber fed by port 30 builds up O-ring 58 is forced toward its seat member 62 and the spool is urged in the opposite direction against the force of spring 68 by pressure fluid acting against O-ring 52 sealed lands 50 and 46. This movement urges the spool seat 56 away from sealing engagement with the flow control port 18 whereby fluid at the lower end of the piston flows through line 22, port 18, chamber 16, port 24 and line 28 to the inlet side of pump 74. In FIG. 6 the direction of flow of the fluid in lines 38, 40, 22 and 28 and the direction of movement of the piston 78 are shown by directional arrows.

If the direction of the piston is to be reversed, i.e. if the piston is to urge the mass 88 upwardly the pump 74 is reversed so that line 28 becomes the pressure line and line 38 the return line. As pressure builds up in chamber 16 the fluid is forced past opening 64 between annulus 62 and the spool and urges O-ring 58 toward spring 68. When the O-ring 58 engages the face of fixed land 48 continued movement thereof moves the land and its connected spool against the urging of spring 68 thus moving valve seat 56 away from port 18 so that pressure fluid urges the piston upward as shown by the directional arrows.

Fluid ahead of piston 78 flows back to the pump 74 via line 40, ports 32 and 30 and line 38. As soon as the pump is stopped spring 68 overcomes the force of the hydraulic fluid and closes the valve. Once the valve is closed downward force by mass 88 on the piston 78 causes no movement of the piston as the area of the spool exposed through port 18 is not great enough to force the spool toward the lock ring 70 even though the pressure in line 22 may be as great or even greater than the pressure of the pressure fluid developed by pump 74. Thus it will be seen that the area of the spool portion 56 which closes bore 18 is less than the area of the spool moving lands so that the spring 68 will maintain the flow control valve in the closed position unless the pump is operating.

With this arrangement the sensitivity of the device may be readily varied by varying:

(1) The force of the spring 68;
(2) The diameter of the spool lands; and
(3) The diameter of the bore 18 or combinations thereof.

It will be appreciated that if an abnormal force is directed against piston 78 the force would be relieved about the valve seat 56 thus preventing damage to the system by such abnormal pressure build up discussed above. It will be recognized that the abnormal pressure build up may be caused by thermal expansion of the fluid in the system.

It will be noted from the foregoing description of the operation of the system that spring 68 is always under compression regardless of the direction of operation of the pump. Further regardless of the direction of operation of the pump the valve opens when the spool moves toward the spring end of the valve housing. Thus the simple assembly functions with two directions of fluid flow using a single control spool which moves in one direction to the flow open position.

From the foregoing description it will be seen that a very simple and highly effective automatic flow control valve means and closed circuit pressure fluid control system have been disclosed which fully accomplish the aims and objects hereinbefore set forth. It will also be appreciated that while a preferred device and system have been specifically described together with certain variations therein other modifications are contemplated as being within the scope of the invention.

I claim:

1. A flow control valve comprising a housing having a bore therein, a flow control spool slidably mounted in said bore, first and second spaced lands on said spool, a pair of fluid pressure ports in said housing each communicating with the spool between said first and second spaced lands, a pressure fluid control port in said housing at one end of the spool bore and adjacent said first land, resilient means continuously urging said spool into fluid sealing engagement with said control port, a further fluid pressure port in said housing communicating with the spool bore between the first land and the control port, and sealing means mounted on said spool for sliding movement between said first land and the further fluid pressure port and sealing the pair of fluid pressure ports from the control port and the further fluid pressure port.

2. A flow control valve comprising a housing having a bore therein, a flow control spool slidably mounted in said bore, first and second spaced lands on said spool, a pair of fluid pressure ports in said housing each communicating with the spool between said first and second spaced lands, a pressure fluid control port in said housing at one end of the spool bore and adjacent said first land, spring means in the bore in the housing and having one end engaging the housing and the other end engaging the spool to continuously urge the spool into fluid sealing engagement with said control port, a valve chamber between the control port and the said first land, sealing means mounted on said spool for sliding movement between the said first spool land and the said valve chamber, said sealing means adapted to seal the pair of fluid pressure ports from the valve chamber and to urge the spool away from the control port when the pressure in the valve chamber acting on the sealing means overcomes the force of the spring means, and a further fluid pressure port in said housing communicating with the valve chamber and communicating with the control port when the spool is urged by pressure fluid out of sealing engagement with the control port.

3. The invention defined in claim 2 wherein the area of the spool adapted to seal said control port is substantially less than the area of the sliding seal exposed to pressure in the valve chamber.

4. The invention defined in claim 3 wherein the area of said second land exposed to pressure fluid from said pair of pressure fluid ports is substantially equal to the area of the sliding seal exposed to pressure fluid in said valve chamber.

5. A closed circuit pressure fluid control system including a reversible pump having pressure fluid inlet and outlet ports, a fluid pressure motion device having fluid inlet and outlet ports, and a fluid flow control device between said pump and the motion device, said flow control device comprising a housing having a bore therein, a flow control spool slidably mounted in said bore, first and second spaced lands on said spool, a pair of fluid pressure ports in said housing each communicating with the spool between said first and second spaced lands, conduit means connecting one of the pump ports and one of the motion device ports through said pair of ports in the control device housing, a pressure fluid control port in said housing at one end of the spool bore and adjacent said first land, conduit means connecting the other motion device port and the control port, resilient means continuously urging said spool into fluid sealing engagement with said control port, a further fluid pressure port in said housing communicating with the spool bore between the first land and the control port, conduit means connecting the other pump port and said further pressure port in the housing, sealing means mounted on said spool for sliding movement between said first land and the further fluid pressure port and sealing the pair of fluid pressure ports from the control port and the further fluid pressure port.

6. The invention defined in claim 5 including resilient sealing means for said second land, and wherein the effective areas of resilient sealing means and the slidable seal are substantially equal and greater than the area of the spool sealing the control port.

No references cited.

EDGAR W. GEOGHEGAN, *Primary Examiner.*